(12) United States Patent
Namie

(10) Patent No.: US 7,351,170 B2
(45) Date of Patent: Apr. 1, 2008

(54) HYDRAULIC TENSIONER

(75) Inventor: Tsutomu Namie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 482 days.

(21) Appl. No.: 11/032,582

(22) Filed: Jan. 10, 2005

(65) Prior Publication Data

US 2005/0197223 A1 Sep. 8, 2005

(30) Foreign Application Priority Data

Mar. 8, 2004 (JP) .................. 2004-064587

(51) Int. Cl.
*F16H 7/08* (2006.01)

(52) U.S. Cl. ........................................ 474/110

(58) Field of Classification Search ............ 474/101, 474/109, 110
See application file for complete search history.

(56) References Cited

U.S. PATENT DOCUMENTS

| | | | |
|---|---|---|---|
| 4,976,661 A | 12/1990 | Ojima | |
| 4,997,411 A | 3/1991 | Breon et al. | |
| 5,037,357 A | 8/1991 | Ojima | |
| 5,073,158 A | 12/1991 | Ojima | |
| 5,595,549 A * | 1/1997 | Jarrand | 474/91 |
| 5,607,368 A * | 3/1997 | Hida et al. | 474/110 |
| 5,702,317 A * | 12/1997 | Kawashima et al. | 474/110 |
| 5,704,860 A * | 1/1998 | Stief | 474/110 |
| 6,203,461 B1 | 3/2001 | Watanabe et al. | |
| 6,592,479 B2 * | 7/2003 | Nakakubo et al. | 474/109 |
| 6,811,505 B2 | 11/2004 | Hashimoto et al. | |
| 7,174,799 B2 * | 2/2007 | Yoshida et al. | 474/110 |
| 2001/0016530 A1 | 8/2001 | Grunke et al. | |
| 2004/0266572 A1 * | 12/2004 | Yoshida et al. | 474/110 |
| 2005/0096166 A1 * | 5/2005 | Wakabayashi et al. | 474/110 |
| 2005/0227799 A1 * | 10/2005 | Yoshida | 474/110 |
| 2005/0265856 A1 * | 12/2005 | Yoshida | 417/362 |
| 2006/0094549 A1 * | 5/2006 | Yoshida et al. | 474/110 |

FOREIGN PATENT DOCUMENTS

| | | |
|---|---|---|
| DE | 25 04 707 A1 | 2/1975 |
| DE | 195 17 935 A1 | 5/1995 |
| DE | 296 13 535 U1 | 8/1996 |
| DE | 100 11 195 A1 | 3/2000 |
| JP | 45-4947 | 3/1970 |
| JP | 07-042806 | 2/1995 |
| JP | 11-336855 | 12/1999 |
| JP | 2002-206603 | 7/2002 |
| JP | 2002206603 | 7/2002 |

* cited by examiner

*Primary Examiner*—Vicky A Johnson
(74) *Attorney, Agent, or Firm*—Howson & Howson LLP

(57) ABSTRACT

A hydraulic tensioner comprises a hollow plunger slidable in a plunger-accommodating hole in a housing, the plunger and housing forming a high pressure oil chamber. A check valve unit, which includes a check ball and a check ball retainer, allows oil to flow into the oil chamber, but prevents reverse flow. A plunger-biasing spring, disposed inside the high-pressure chamber includes a close-wound portion fitting over the retainer of the check valve unit, and a portion having spaced windings, which extends and compresses axially with protruding and retracting movement of the plunger. The outer diameter of the close-wound portion is greater than the outer diameter of the portion having spaced windings.

1 Claim, 5 Drawing Sheets

HYDRAULIC TENSIONER

FIELD OF THE INVENTION

This invention relates to hydraulic tensioners used for maintaining proper tension in flexible power transmission media such as timing chains or timing belts in vehicle engines.

BACKGROUND OF THE INVENTION

Hydraulic tensioners have been widely used to maintain proper tension in, and prevent vibration of, power transmission media such as timing chains, which transmit rotation from a crankshaft to one or more camshafts in a vehicle engine. A typical hydraulic tensioner is shown and described in Japanese Laid-open Patent Publication No. Hei-11-336855 (page 1, FIG. 5).

As shown in FIG. 5 of the present application, in a conventional hydraulic tensioner 500, a plunger 520 is slidable in a plunger-accommodating hole 511, formed in a housing 510. A blind bore 521 is formed in the interior of the plunger 520, and a plunger-biasing spring 530, which biases the plunger 520 in the protruding direction, is disposed between the bottom of the plunger-accommodating hole 511 and the closed end of blind bore 521 in the plunger. A high pressure chamber R is formed by the plunger-accommodating hole 511 and the hollow portion 521 of the plunger 520. This high pressure chamber R is filled with oil, supplied from the engine through a check valve mechanism 540.

The check valve mechanism 540 comprises a ball seat 541, a check ball 542, a ball biasing spring 543, which biases the check ball 542 against the ball seat 541, and a retainer 544, which supports spring 543. The check valve mechanism is disposed at the bottom of the plunger-accommodating hole 511, i.e., at the end of hole 511 remote from the opening through which the plunger protrudes. The check valve mechanism faces the hollow portion 521 of the plunger 520. Oil can flow through the check valve into the high pressure chamber R, but the check valve blocks reverse flow of oil.

In the conventional hydraulic tensioner 500, the retainer 544 of the check valve unit protrudes into the interior of the plunger-biasing spring 530. When the tensioner is used to maintain tension in a timing chain, and the tension in the timing chain changes, the spring 530 expands and contracts radially as well as axially. The expansion and contraction of the spring can cause wear and breakage of the retainer 544. Moreover, in the conventional hydraulic tensioner 500, the inner diameter of the spring 530 is restricted by the outer diameter of the retainer 544. The inner diameter of the spring decreases when the spring is in its relaxed condition and increases when the spring is compressed. Therefore, if the inner diameter of the spring is smaller than the outer diameter of the retainer 544, as shown in FIG. 6, the spring cannot fit over the retainer 544. Therefore, the spring must have a relaxed diameter such as to enable it to fit over the retainer, with a clearance. But, the requirement for a clearance prevents the spring from fitting snugly onto the retainer or ball seat. Moreover, especially where the spring is adapted to sustain a high load, the size and shape of the retainer and the ball seat must be selected in accordance with the properties of the spring 530, resulting in high production cost.

An object of this invention is to solve the above-mentioned problems, and to provide a hydraulic tensioner, in which wear and breakage of the check valve unit are prevented, in which the plunger-biasing spring can be reliably fitted onto the check valve unit, and which can be adapted to a higher chain tension load by replacement of the plunger-biasing spring alone.

SUMMARY OF THE INVENTION

The hydraulic tensioner in accordance with the invention comprises a tensioner housing and a plunger. The housing has a plunger-accommodating hole having a cylindrical inner wall, an opening at one end and a bottom at an end opposite from the opening. The plunger is slidable in the plunger-accommodating hole, protrudes therefrom, and is adapted to maintain tension in a flexible, traveling power transmission medium.

The plunger and housing together cooperate to define a high pressure oil chamber. A check valve unit is disposed within the plunger-accommodating hole to allow oil to flow into the high pressure chamber but block reverse flow of oil from the chamber. The check valve unit comprises a ball seat, a check ball biased onto the ball seat, and a retainer limiting movement of the check ball. A plunger-biasing spring, accommodated in the high pressure oil chamber, urges the plunger in a protruding direction. The plunger-biasing spring is a coil spring having a close-wound portion fitted over the retainer, and a second portion, connected to the close-wound portion. The second portion has spaced windings and is axially extensible and compressible with axial protruding and retracting movements of the plunger respectively. The outer diameter of the close-wound portion is larger than the outer diameter of the second portion.

The close-wound portion fits over the retainer and can be reliably incorporated into the tensioner by sliding onto the retainer of the check valve unit without expansion or contraction. Wear and breakage, which are liable to occur in the retainer of a conventional check valve unit are prevented, and the plunger-biasing spring can bias the plunger reliably without being restrained by the retainer.

Furthermore, since the outer diameter of the close-wound portion of the spring is larger than the outer diameter of the portion having spaced windings, the latter portion, which expands and contracts with movement of the plunger, can be supported by seating the large-diameter close-wound portion over the retainer. Even if a large diameter wire is used to form the plunger-biasing spring, it is unnecessary to modify the sizes and shapes of the ball seat and the retainer to accommodate different loads imparted to the spring, and the tensioner can be adapted to higher loads by replacement of the plunger-biasing spring alone. Furthermore, even if the tensioner properties are varied significantly, the production cost of the tensioner is not significantly increased.

DETAILED DESCRIPTION OF THE PREFERRED EMBODIMENTS

Figure 1:
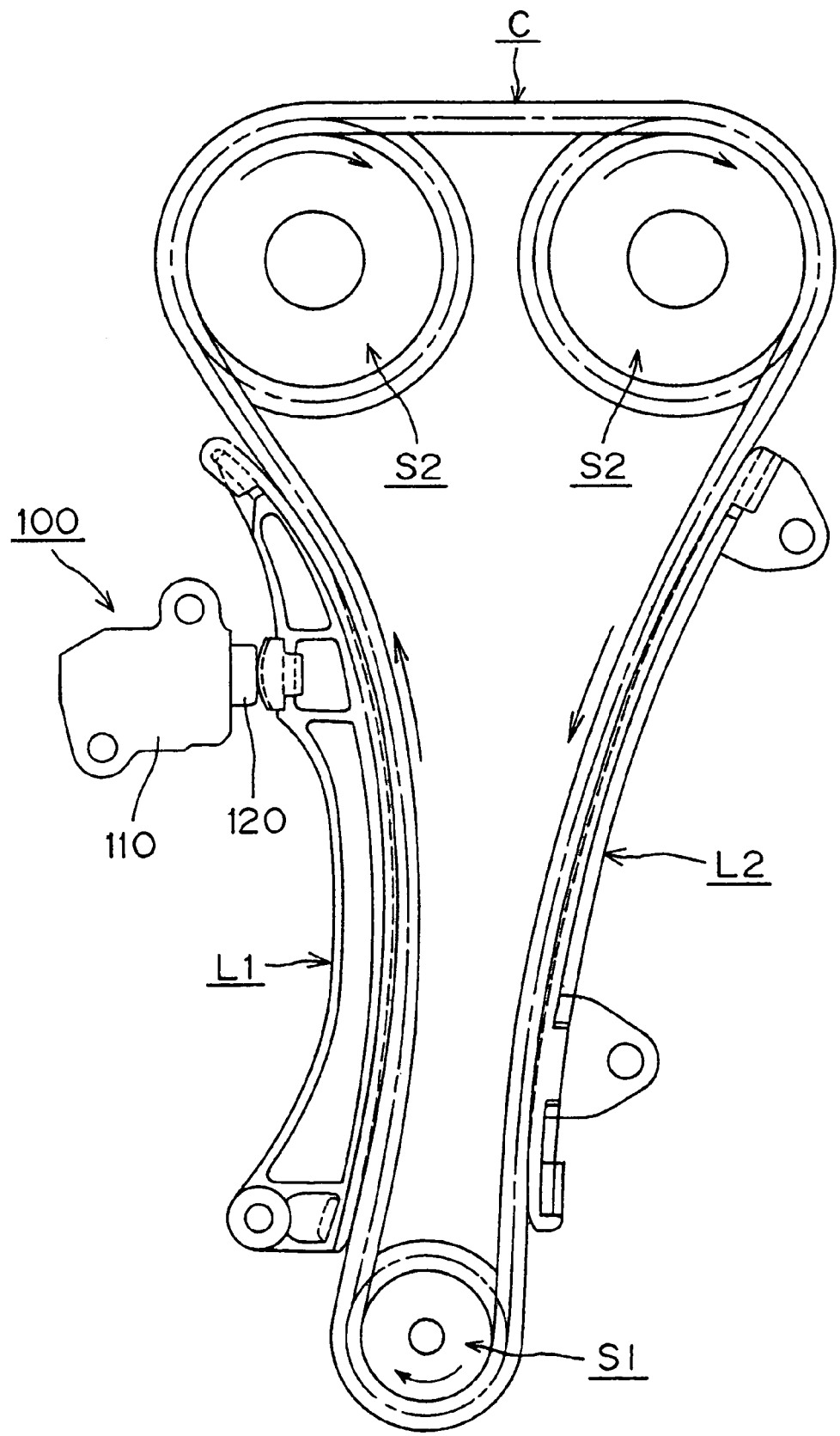
FIG. 1 is a schematic elevational view showing a tensioner in accordance with the invention in use for maintaining tension in the timing chain of an internal combustion engine.

As shown in FIG. 1, a tensioner 100 may be attached to an engine body (not shown) adjacent the slack side of a timing chain C, which is in meshing engagement with a driving sprocket S1, rotated by the crankshaft of the engine, and two driven sprockets S2, which are fixed on engine valve-operating camshafts. Arrows show the directions of movement of the timing chain and sprockets. A plunger 120, which protrudes from the tensioner housing 110, presses a pivoted lever L1 against the back surface of the timing chain C on the slack side, i.e., the side moving from the drive sprocket S1 to one of the driven sprockets S2. A fixed guide L2, guides the tension side of the timing chain C.

Figure 2:
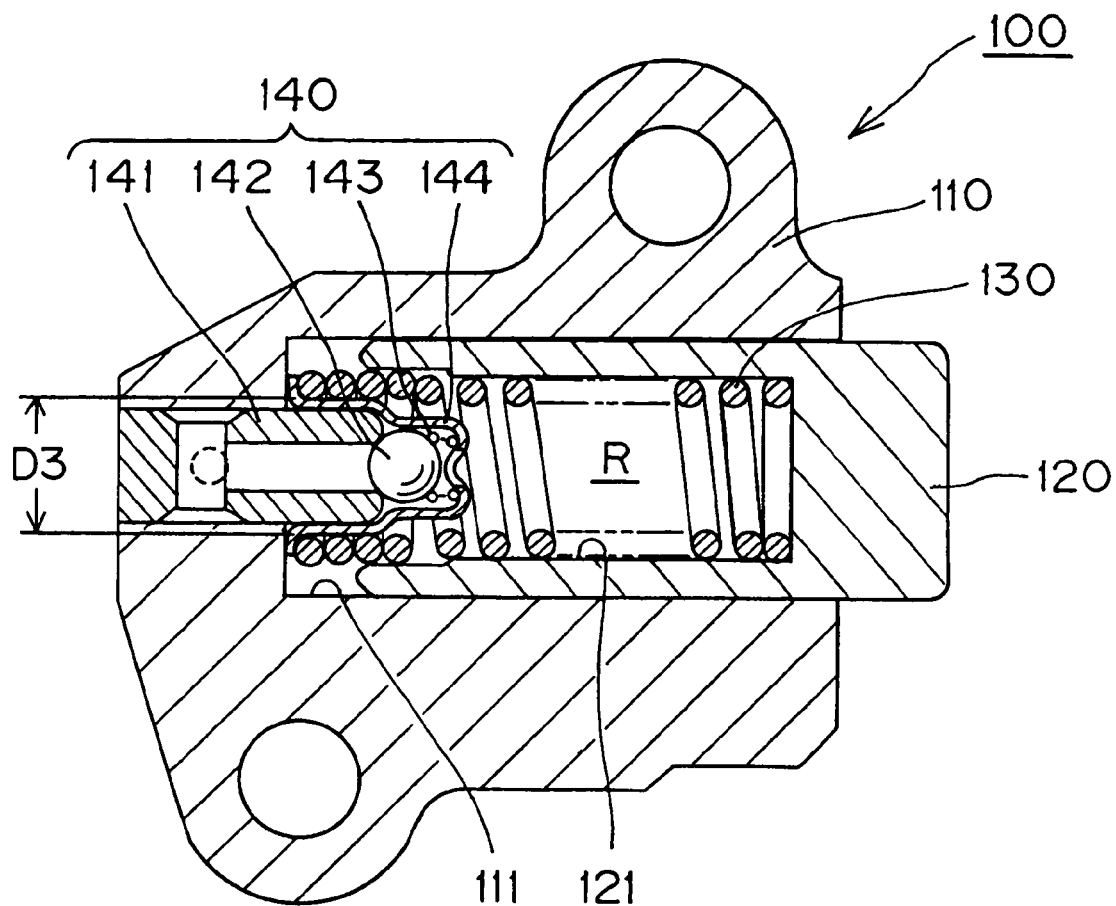
FIG. 2 is a cross-sectional view of the hydraulic tensioner shown in FIG. 1.

In the hydraulic tensioner 100, shown in FIG. 2, the plunger 120, the outside of which is cylindrical, is slidable in a plunger-accommodating hole 111 formed in the housing 110. A hollow portion 121, formed inside the plunger and having an open end, accommodates a coiled, plunger-biasing compression spring 130, which urges the plunger 120 in the protruding direction. One end of the spring bears against the bottom of the plunge-accommodating hole, and the other end of the spring bears against the closed end of the hollow portion 121 inside the plunger.

The plunger-accommodating hole 111 and the hollow portion 121 form a high pressure oil chamber R, which is filled with oil supplied under pressure by an oil supply (not shown) from the engine through a check valve unit 140. The check valve unit 140 allows oil to flow into the high pressure chamber R, but blocks reverse flow of oil. As seen in FIG. 2, the check valve unit is incorporated into the housing and protrudes into the high pressure chamber R. The check valve unit 140 comprises a ball seat, a check ball disposed opposite the ball seat 141, a ball-biasing spring 143, which biases the check ball 142 against the ball seat 141, and a retainer 144, which supports the ball biasing spring 143 and restricts movement of the check ball 142.

When an impact force acts on the front end of the plunger 120, which protrudes from the housing 110, through the movable lever L1 as a result of a change in tension in the timing chain C, the plunger 120 is rapidly pressed in the retracting direction against the force applied by the spring 130. The pressure of the oil in the high pressure chamber R is increased, and the check ball 142 is pressed against the ball seat 141 so that reverse flow of oil from the high pressure chamber R is blocked.

Figure 3:
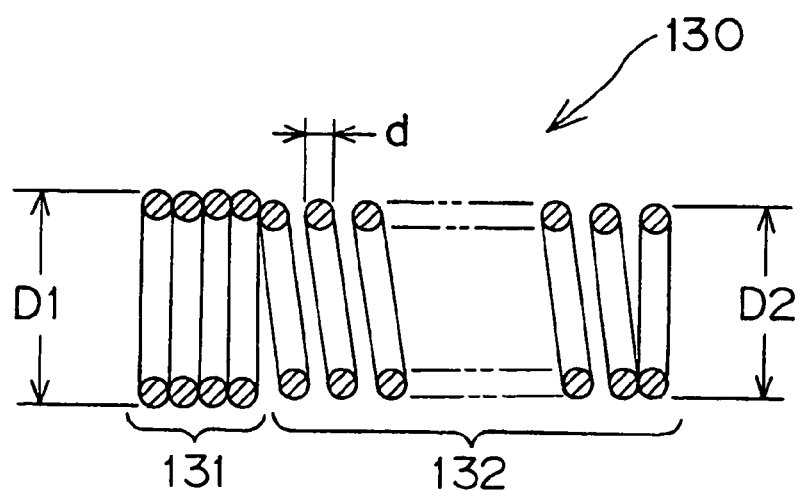
FIG. 3 is an enlarged view of the plunger-biasing spring of the tensioner shown in FIG. 2.

As shown in FIG. 3, the plunger-biasing spring 130 comprises a close-wound portion 131. This close-wound portion is fitted over the retainer 144, and its axial length is preferably at least as great as the axial length of the larger diameter cylindrical part of the retainer which fits over the ball seat. The spring also comprises a portion 132 in which the adjacent windings are spaced from one another. These two portions 131 and 132 are connected, and constitute two parts of a continuous coil. The latter portion 132 extends and compresses axially, and is the portion of the spring that biases the plunger 120 in the protruding direction. The outer diameter D1 of the coil of the close-wound portion 131 is larger than the outer diameter D2 of the coil of portion 132.

The outer diameter D2 of portion 132 is such that spring 130 can bias the plunger so that it slides along the wall surface of the hollow portion 121 of the housing without backlash. The diameter D2 of portion 132 of the spring can be made smaller than the inner diameter of hollow portion 121 of the plunger, and diameter D2 should be smaller than the inner diameter of hollow portion 120 especially if the spring is formed of a spring wire having a relatively large diameter d.

The close-wound portion 131 fits snugly over the retainer 144 of the check valve unit 140, and can be inserted into the plunger-accommodating hole so that it slides smoothly over the retainer. The close-wound portion does not expand or contract axially as the plunger moves, and therefore it also does not expand or contract radially. Thus, as tension of the timing chain C varies, wear and breakage of retainer of the check valve unit, which are liable to occur in a conventional tensioner, can be avoided, while the portion 132, having spaced windings, can reliably exert a proper biasing force on the plunger 120 without being restrained by the retainer 144.

The outer diameter D1 of the closewound portion 131, is larger than the outer diameter D2 of portion 132, and the outer diameter D2 is independent of the diameter D3 of the retainer 144. Accordingly a spring wire having a relatively large wire diameter d can be used to form the plunger-biasing spring 130. Modifications of the sizes and shapes of the check valve ball seat 141 and the retainer 144, to accommodate various loading properties of the spring 130 are unnecessary. The tensioner can be adapted to various load requirements simply by the replacement of the plunger-biasing spring 130, even in the case of tensioners designed to sustain relatively high loads. Consequently, production costs are kept relatively low.

Figure 4:
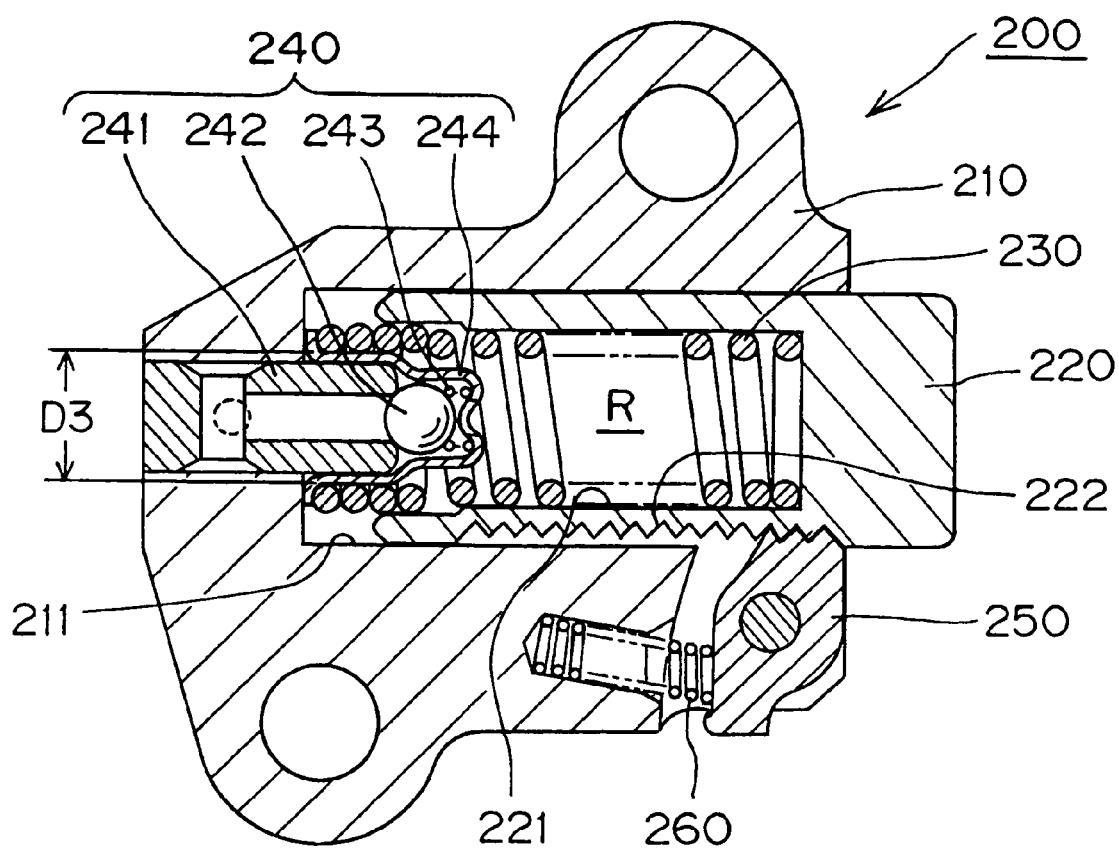
FIG. 4 is a cross-sectional view of a hydraulic tensioner in accordance with a second embodiment of the invention.
Figure 5:
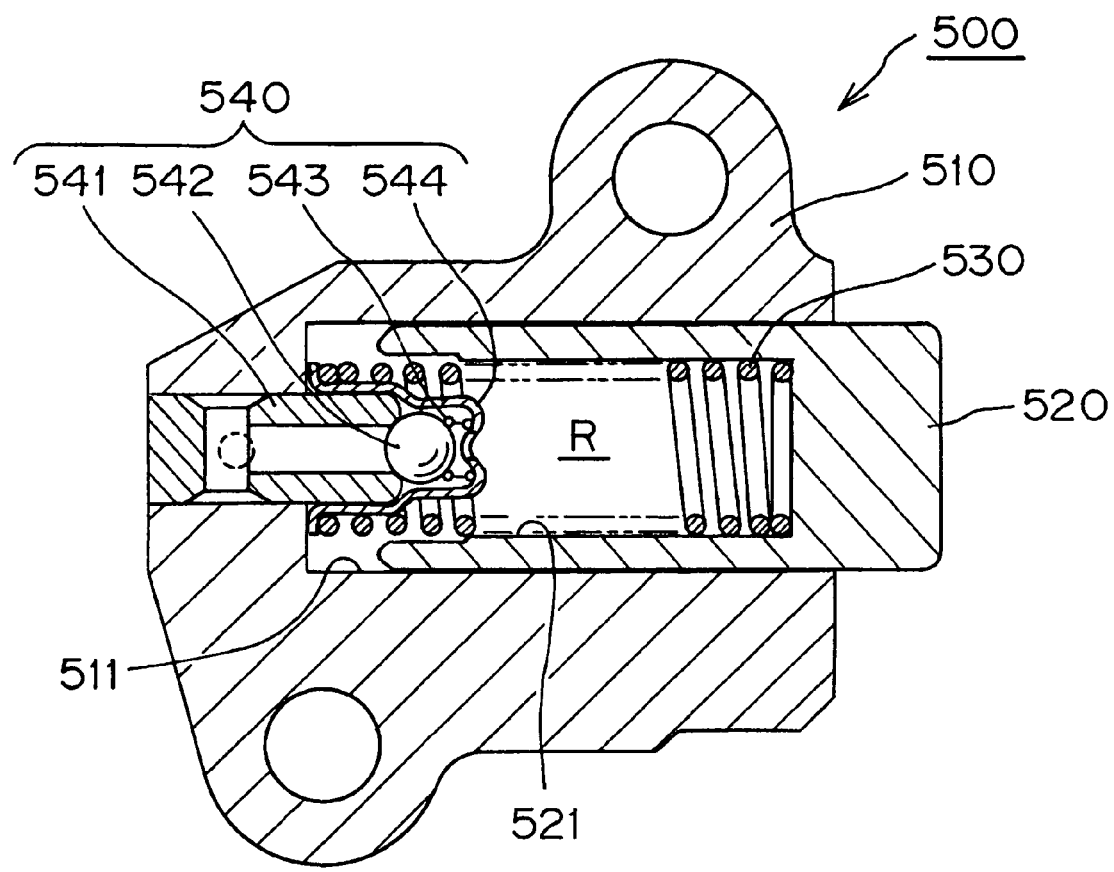
FIG. 5 is a cross-sectional view of a conventional hydraulic tensioner.
Figure 6:
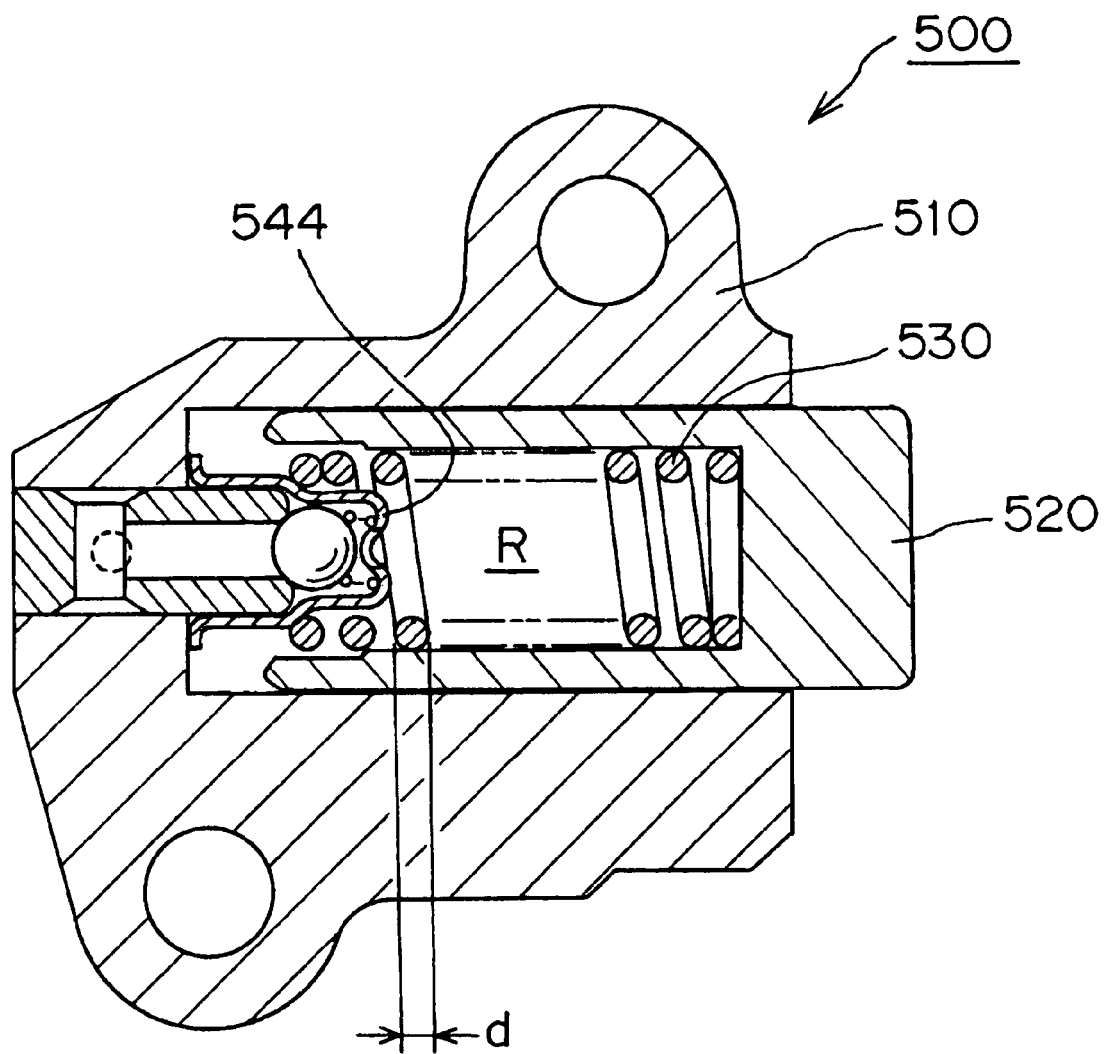
FIG. 6 is a cross-sectional view of a modified conventional hydraulic tensioner.

The hydraulic tensioner 200, shown in FIG. 4, is different from the tensioner 100 of FIG. 2 in that it includes a ratchet mechanism in which a rack 222, formed on the exterior of the plunger 220, is engaged by a pawl 250 pivoted on the housing 210 to block retracting movement of the plunger. A ratchet biasing spring 260 biases the ratchet pawl 250 toward the rack 222. Otherwise the tensioner 200 is substantially the same as tensioner 100. Thus, corresponding components of the tensioner 200, shown in FIG. 4, are denoted by corresponding reference numbers in the 200 range.

The plunger-biasing spring 230 includes a close-wound portion 231, which fits over retainer 244, and a portion 232, having spaced windings, which biases the plunger 220. Portion 232 is connected to the close-wound portion 231, and the outer diameter D1 of the coil of the close-wound portion 231 is larger than the outer diameter D2 of the coil of portion 232.

Since, in the plunger-biasing spring 230, the close-wound portion 231 fits over the retainer 244 of the check valve unit 240, the spring may be reliably incorporated into the tensioner by sliding it over the retainer 244 in a without expansion and contraction. Wear and breakage of the retainer of the check valve unit are prevented, and portion 232 can bias the plunger 220 reliably in the protruding direction without being restrained by the retainer 244.

Furthermore, by making the outer diameter D1 of the coil of the close-wound portion 231 larger than the outer diameter D2 of the coil of portion 232, the outer diameter D2 is independent of the diameter D3 of the retainer 244, and a spring wire having a large wire diameter d can be used to form the plunger-biasing spring 230. Thus, modifications of the sizes and shapes of the ball seat 241, and the retainer 244, to accommodate the load sustaining requirements of the plunger-biasing spring 230, are not needed, and the tensioner can be adapted to a higher chain tension load by replacement of the plunger-biasing spring 230 alone. Furthermore, even if the tensioner properties are changed, the production cost is not changed significantly. Thus the benefits of the invention are very significant.

I claim:

1. A hydraulic tensioner comprising:
   a tensioner housing having a plunger-accommodating hole, said hole having a cylindrical inner wall, an opening at one end and a bottom at an end opposite from said opening;

a plunger slidable in said plunger-accommodating hole and protruding therefrom, said plunger being adapted to maintain tension in a flexible, traveling power transmission medium, said plunger and said housing together cooperating to define a high pressure oil chamber;

a check valve unit, disposed within said plunger-accommodating hole, for allowing oil to flow into said high pressure oil chamber but blocking reverse flow of oil from said high pressure oil chamber, said check valve unit comprising a ball seat, a check ball biased onto the ball seat, and a retainer limiting movement of the check ball; and a plunger-biasing spring, accommodated in said high pressure oil chamber, the plunger-biasing spring urging the plunger in a protruding direction;

wherein said plunger-biasing spring is a continuous coil spring having a first portion consisting of windings fitted directly to said retainer, and a second portion consisting of windings, connected to said first portion, the windings of said second portion being spaced axially from one another by a spacing greater than the axial spacing of the windings of the first portion, said second portion having a uniform outer diameter, and being axially extensible and compressible with axial protruding and retracting movements of the plunger respectively, the outer diameter of said first portion also being uniform, and being larger than the outer diameter of said second portion.

* * * * *